(12) United States Patent
Dan et al.

(10) Patent No.: US 11,120,958 B2
(45) Date of Patent: Sep. 14, 2021

(54) RELAY HOLDING CIRCUIT AND BATTERY MANAGEMENT SYSTEM

(71) Applicant: Contemporary Amperex Technology Co., Limited, Ningde (CN)

(72) Inventors: Zhimin Dan, Ningde (CN); Delong Shi, Ningde (CN); Yizhen Hou, Ningde (CN); Wei Zhang, Ningde (CN); Liansong Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/981,260

(22) PCT Filed: Nov. 15, 2019

(86) PCT No.: PCT/CN2019/118892
§ 371 (c)(1),
(2) Date: Sep. 15, 2020

(87) PCT Pub. No.: WO2020/098799
PCT Pub. Date: May 22, 2020

(65) Prior Publication Data
US 2021/0027961 A1  Jan. 28, 2021

(30) Foreign Application Priority Data
Nov. 16, 2018 (CN) .......................... 201811365833.2

(51) Int. Cl.
*H01H 47/32* (2006.01)
*B60L 50/60* (2019.01)
(Continued)

(52) U.S. Cl.
CPC ........... *H01H 47/32* (2013.01); *B60L 3/0046* (2013.01); *B60L 3/0069* (2013.01); *B60L 50/60* (2019.02); *H01H 47/002* (2013.01); *H01H 47/18* (2013.01)

(58) Field of Classification Search
CPC ........ H01H 47/00; H01H 47/18; H01H 47/22; H01H 47/32; B60L 3/00; B60L 50/60
See application file for complete search history.

(56) References Cited

U.S. PATENT DOCUMENTS

2013/0116875 A1   5/2013  Oh et al.
2016/0229309 A1   8/2016  Mitsutani
(Continued)

FOREIGN PATENT DOCUMENTS

| CN | 104827921 A | 8/2015 |
|---|---|---|
| CN | 105857052 A | 8/2016 |

(Continued)

OTHER PUBLICATIONS

PCT International Search Report for PCT/CN2019/118892 dated Feb. 19, 2020, 14 pages.
(Continued)

*Primary Examiner* — Thienvu V Tran
*Assistant Examiner* — Lorena D Bruner
(74) *Attorney, Agent, or Firm* — Law Offices of Liaoteng Wang

(57) ABSTRACT

The embodiments of the present disclosure disclose a relay holding circuit and a battery management system. the relay holding circuit may include: a high-voltage isolated power source, a power source driving module, and a microprocessor of a battery management system; the high-voltage isolated power source may be respectively connected to two electrodes of a battery pack, an output terminal of the power source driving module, the microprocessor, and a first ter- (Continued)

minal of a first switching device; an input terminal of the power source driving module may be connected to the microprocessor; the microprocessor may be further connected to a primary battery, the microprocessor may output a low-level signal to the power source driving module when the primary battery supplies power abnormally.

11 Claims, 10 Drawing Sheets

(51) Int. Cl.
*B60L 3/00* (2019.01)
*H01H 47/00* (2006.01)
*H01H 47/18* (2006.01)

(56) References Cited

U.S. PATENT DOCUMENTS

2017/0144554 A1 5/2017 Mifsud et al.
2018/0301306 A1* 10/2018 Yang .................. H01H 47/32

FOREIGN PATENT DOCUMENTS

| | | |
|---|---|---|
| CN | 205791766 U | 12/2016 |
| CN | 106783392 A | 5/2017 |
| CN | 107994631 A | 5/2018 |
| CN | 108215915 A | 6/2018 |
| CN | 207490551 U | 6/2018 |
| DE | 10033317 A1 | 1/2002 |
| DE | 102011013182 A1 | 9/2012 |
| DE | 102016223527 A1 | 4/2018 |
| JP | 2000134707 A | 5/2000 |
| WO | 2006029582 A1 | 3/2006 |

OTHER PUBLICATIONS

The First Office Action and search report dated Dec. 2, 2020 for Chinese Application No. 201811365833.2, 7 pages.
The extended European search report dated Feb. 5, 2021 for European Application No. 19885616.3, 8 pages.

* cited by examiner

RELAY HOLDING CIRCUIT AND BATTERY MANAGEMENT SYSTEM

CROSS-REFERENCE TO RELATED APPLICATION

This application is a National Stage of International Application No. PCT/CN2019/118892 filed on Nov. 15, 2019, which based on and claims priority to Chinese Patent Application No. 201811365833.2 filed on Nov. 16, 2018, which is incorporated herein by reference in its entirety.

TECHNICAL FIELD

The present application relates to the field of battery technology, and in particular, to a relay holding circuit and a battery management system.

BACKGROUND

A power source of an electric vehicle may come entirely from a power battery, which is connected to a motor of the electric vehicle through a relay. The relay may consist of a coil and a contact group. In actual use, the contact group may be connected to the motor. When the coil is energized, the contact group may turn on the power battery to supply power to the motor. Wherein, a battery management system may control whether the coil is energized or not, and a lead-acid battery may supply power to the battery management system.

At a present stage, when driving the electric vehicle, once the relay is suddenly turned off, the motor will lose power and the electric vehicle will stop suddenly. If this incident occurs on a highway or in a traffic-intensive area, it will cause a serious safety accident.

A reason for the relay being suddenly turned off may be that the lead-acid battery supplies power abnormally, which may be caused by a failure of the lead-acid battery, a breakage of a powerline, or a poor contact. Therefore, how to supply power to the battery management system normally when the lead-acid battery supplies power abnormally has become an urgent problem to be solved.

SUMMARY

Embodiments of the present disclosure provide a relay holding circuit and a battery management system.

In a first aspect, an embodiment of the present disclosure provides a relay holding circuit, the relay holding circuit may include: a high-voltage isolated power source, a power source driving module, and a microprocessor of a battery management system; wherein the high-voltage isolated power source may be respectively connected to two electrodes of a battery pack, an output terminal of the power source driving module, the microprocessor, and a first terminal of a first switching device; an input terminal of the power source driving module may be connected to the microprocessor, a control terminal of the first switching device may be connected to the microprocessor, a second terminal of the first switching device may be connected to a coil of a relay, and a contact of the relay may be disposed on a line between the battery pack and a motor; the microprocessor may be further connected to a primary battery, the microprocessor may output a low-level signal to the power source driving module when the primary battery supplies power abnormally, and the power source driving module may convert high-voltage power output by the battery pack into low-voltage power in response to the low-level signal, so as to supply power to the microprocessor and the second terminal of the first switching device, such that the coil of the relay may remain a conducting state during a period that the primary battery supplies power abnormally.

In a possible implementation of the first aspect, wherein the power source driving module may include: a first switching unit, a second switching unit, and a delay unit; wherein the microprocessor may be respectively connected to a first terminal of the first switching unit and a first terminal of the second switching unit, an input terminal of the delay unit may be connected to a second terminal of the first switching unit, and an output terminal of the delay unit may be respectively connected to the high-voltage isolated power source and a second terminal of the second switching unit; the microprocessor respectively may output a low-level signal to the first switching unit and the second switching unit when the primary battery supplies power abnormally, the first switching unit and the second switching unit may be turned off in response to the low-level signal, and the delay unit may output a high-level signal with delay in a predetermined time period after the first switching unit is turned off, so as to enable the high-voltage isolated power source.

In a possible implementation of the first aspect, wherein the first switching unit may include a first optical coupler, a second switching device, and a first resistor; wherein a first terminal of a light emitting end of the first optical coupler may be connected to a first pull-up power source, a second terminal of the light emitting end of the first optical coupler may be connected to a first terminal of the second switching device, a second terminal of the second switching device may be grounded, and a control terminal of the second switching device may be connected to the microprocessor; a first terminal of a light receiving end of the first optical coupler may be connected to a second pull-up power source, a second terminal of the light receiving end of the first optical coupler may be respectively connected to the input terminal of the delay unit and a first terminal of the first resistor, and a second terminal of the first resistor may be grounded.

In a possible implementation of the first aspect, wherein the second switching unit may include a second optical coupler, a third switching device, and a second resistor; wherein a first terminal of a light emitting end of a second optical coupler may be connected to a third pull-up power source, a second terminal of the light emitting end of the second optical coupler may be connected to a first terminal of the third switching device, a second terminal of the third switching device may be grounded, and a control terminal of the third switching device may be connected to the microprocessor; a first terminal of a light receiving end of the second optical coupler may be respectively connected to the output terminal of the delay unit and a first terminal of the second resistor, a second terminal of the second resistor may be connected to a fourth pull-up power source, and a second terminal of the light receiving end of the second optical coupler may be grounded.

In a possible implementation of the first aspect, wherein the delay unit may include a first delay chip, and the power source driving module may further include a voltage-stabilizing source for supplying power to the first delay chip; the voltage-stabilizing source may include a first voltage-stabilizing diode and a third resistor; an anode of the first voltage-stabilizing diode may be grounded, a cathode of the first voltage-stabilizing diode may be respectively connected to a first terminal of the third resistor and a power supplying terminal of the first delay chip, and a second terminal of the third resistor may be connected to a positive electrode of the battery pack.

In a possible implementation of the first aspect, wherein the relay holding circuit may further include an energy storage module and a delay driving module; wherein a first terminal of the energy storage module may be connected to the primary battery, the high-voltage isolated power source, and the second terminal of the first switching device, and a second terminal of the energy storage module may be connected to the microprocessor; an input terminal of the delay driving module may be connected to the microprocessor, and an output terminal of the delay driving module may be connected to the control terminal of the first switching device; the microprocessor respectively may output a low-level signal to the energy storage module and the delay driving module when the primary battery supplies power abnormally, the energy storage module may supply power to the second terminal of the first switching device in response to the low-level signal, and the delay driving module may output a high-level signal with delay to the control terminal of the first switching device in response to the low-level signal, such that the coil of the relay may remain the conducting state during a period that the primary battery supplies power abnormally and the high-voltage isolated power source is not started.

In a possible implementation of the first aspect, wherein the energy storage module may include: a unidirectional conduction unit, a third switching unit, and an energy storage unit; wherein an input terminal of the unidirectional conduction unit may be connected to the primary battery, and an output terminal of the unidirectional conduction unit may be connected to a first terminal of the energy storage unit; a second terminal of the energy storage unit may be connected to a first terminal of the third switching unit, a second terminal of the third switching unit may be connected to the second terminal of the first switching device, and a control terminal of the third switching unit may be respectively connected to the primary battery and the microprocessor.

In a possible implementation of the first aspect, wherein the third switching unit may include a fourth resistor, a fifth resistor, a second voltage-stabilizing diode, a comparator, a fourth switching device, and a fifth switching device; wherein the fourth switching device may be connected in parallel to two terminals of the unidirectional conduction unit, and a control terminal of the fourth switching device may be connected to an output terminal of the comparator; a non-inverting input terminal of the comparator may be respectively connected to a first terminal of the fourth resistor and a first terminal of the fifth resistor, a second terminal of the fourth resistor may be connected to the primary battery, and a second terminal of the fifth resistor may be grounded; an inverting input terminal of the comparator may be respectively connected to a cathode of the second voltage-stabilizing diode and a first terminal of the fifth switching device, an anode of the second voltage-stabilizing diode may be grounded, a second terminal of the fifth switching device may be grounded, and a control terminal of the fifth switching device may be connected to the microprocessor.

In a possible implementation of the first aspect, wherein the third switching unit may further include a sixth resistor and a unidirectional conduction device; a first terminal of the sixth resistor may be connected to the non-inverting input terminal of the comparator, a second terminal of the sixth resistor may be connected to an anode of the unidirectional conduction device, and a cathode of the unidirectional conduction device may be connected to the output terminal of the comparator.

In a possible implementation of the first aspect, wherein the energy storage module may further include a voltage-stabilizing unit, and the voltage-stabilizing unit may include a third voltage-stabilizing diode and a seventh resistor; a cathode of the third voltage-stabilizing diode may be connected to the first terminal of the energy storage unit, an anode of the third voltage-stabilizing diode may be connected to a first terminal of the seventh resistor, and a second terminal of the seventh resistor may be grounded.

In a possible implementation of the first aspect, wherein the delay driving module may include a second delay chip, an input terminal of the second delay chip may be connected to the microprocessor, and an output terminal of the second delay chip may be connected to the control terminal of the first switching device.

In a second aspect, an embodiment of the present disclosure provides a battery management system, the battery management system may include the relay holding circuit described above.

BRIEF DESCRIPTION OF THE DRAWINGS

The features, advantages, and technical effects of the exemplary embodiments of the present disclosure will be described below with reference to the drawings.

DETAILED DESCRIPTION

Embodiments of the present disclosure are described in further detail below with reference to the accompanying drawings and embodiments. The detailed description of the following embodiments and drawings are used to exemplarily illustrate the principle of the present application, but cannot be used to limit the scope of the application, that is, the application is not limited to the described embodiments.

A power of an electric vehicle may come from a power battery (i.e., a battery pack). A motor of the electric vehicle may be connected to the battery pack via an electric driving switch (such as a relay). When driving the electric vehicle, if the electric driving switch is suddenly turned off, the electric vehicle will lose power and stop suddenly, which is very dangerous.

The applicant of the present disclosure founds that a power failure of a power supply system of a battery management system (BMS) is one of main reasons for the electric driving switch being turned off, and therefore, it is of great practical significance to supply power to the BMS system when the power supply system has the power failure.

Based on this, the embodiments of the present application provide a relay holding circuit and a battery management system. When used in the field of battery technology, the relay holding circuit and the battery management system may combine an isolated power technology and a delay technology. When a lead-acid battery has a power failure, a high-voltage isolated power source module may be enabled, so as to convert high-voltage power of the battery pack into low-voltage power which can be used to supply power to a microprocessor MCU in the BMS system. At the same time, energy stored in a large capacitor may be used to maintain a short-time conducting state of the relay, so as to ensure the safety of the electric vehicle.

Figure 1:
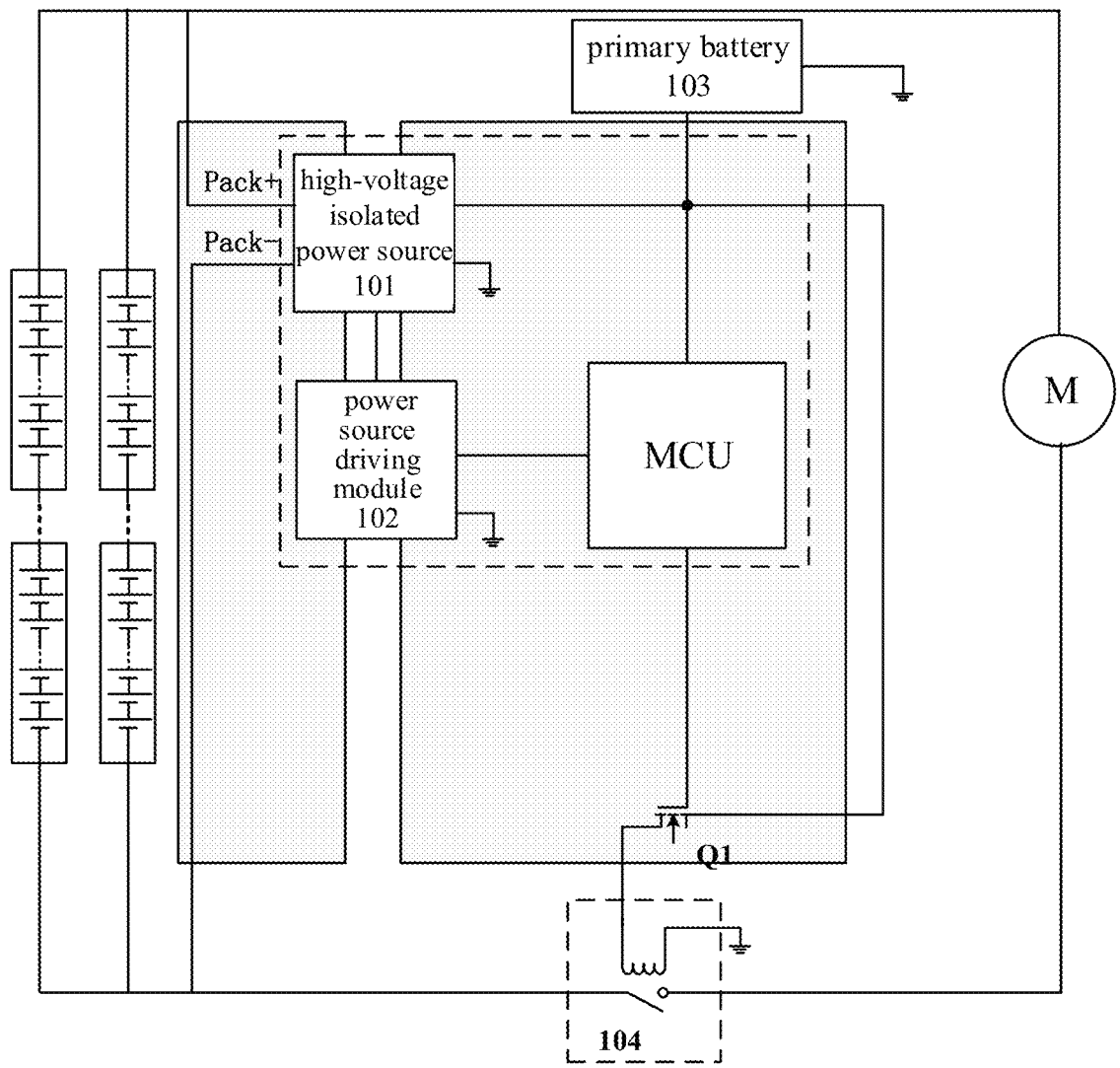
FIG. 1 is a schematic structural diagram of a relay holding circuit according to a first embodiment of the present disclosure.

FIG. 1 is a schematic structural diagram of a relay holding circuit according to a first embodiment of the present disclosure. As shown in FIG. 1, the relay holding circuit may include a high-voltage isolated power source 101, a power source driving module 102 and an MCU.

FIG. 1 also illustrates a primary battery 103, a motor M, a relay 104, and a battery pack of an electric vehicle. Wherein, the primary battery 103 refers to a power supply of the MCU under normal circumstances, and the primary battery used in the field of electric vehicles usually refers to a lead-acid battery. A positive electrode of the battery pack may be indicated as Pack+, a negative electrode of the battery pack may be indicated as Pack−, and the motor M may be connected to the battery pack through the relay 104.

Wherein, one terminal of a coil of the relay 104 may be grounded, the other terminal of the coil of the relay 104 may be connected to a second terminal of a first switching device Q1, a first terminal of the first switching device Q1 may be connected to the primary battery 103, and a control terminal of the first switching device Q1 may be connected to the MCU. When driving the electric vehicle normally, the MCU may output a high-level signal to the control terminal of the first switching device Q1, and the first switching device Q1 may be turned on, such that the battery pack may supply power to the motor M.

As shown in FIG. 1, the high-voltage isolated power source 101 may be respectively connected to two electrodes of the battery pack, an output terminal of the power source driving module 102, the MCU, and the first terminal of the first switching device Q1. An input terminal of the power source driving module 102 may be connected to the MCU. The control terminal of the first switching device Q1 may be connected to the MCU. The second terminal of the first switching device Q1 may be connected to the coil of the relay 104.

As shown in FIG. 1, the high-voltage isolated power source 101 may be connected to the two electrodes of the battery pack, so as to convert high-voltage power output by the battery pack into low-voltage power, and supply power to the MCU and the second terminal of the switching device Q1, such that the coil of the relay 104 may remain a conducting state during a period that the primary battery supplies power abnormally. The high-voltage isolated power source 101 in the present disclosure has an enable function.

A working principle of the relay holding circuit in FIG. 1 may be as follows.

When the primary battery 103 supplies power normally, the MCU may output a high-level signal to the power source driving module 102. The power source driving module 102 may lock the high-voltage isolated power source 101 in response to the high-level signal, such that the high-voltage isolated power source 101 does not work.

When the primary battery 103 supplies power abnormally, the MCU may output a low-level signal to the power source driving module 102. The power source driving module 102 may enable the high-voltage isolated power source 101 in response to the low-level signal, such that the high-voltage isolated power source will work, so as to convert the high-voltage power output by the battery pack into the low-voltage power, and supply power to the MCU and the second terminal of the first switching device Q1, and therefore, the coil of the relay 104 may remain the conducting state during a period that the primary battery 103 supplies power abnormally.

As described above, the relay holding circuit in the embodiments of the present disclosure may be provided with the high-voltage isolated power source 101 and the power source driving module 102. When the primary battery 103 supplies power abnormally (such as a power failure), in order to keep the coil of the relay 104 remaining the conducting state during a period that the primary battery 103 supplies power abnormally, in response to a signal output by the MCU, the power source driving module 102 may enable the high-voltage isolated power source 101, so as to convert the high-voltage power output by the battery pack into the low-voltage power to supply power to the MCU and the second terminal of the first switching device Q1, thereby supplying power to the battery management system normally when the lead-acid battery supplies power abnormally, and avoiding safety accidents caused by sudden stopping of the vehicle during driving.

The specific structure of the relay holding circuit in the embodiments of the present disclosure may be described in detail below.

Figure 2:
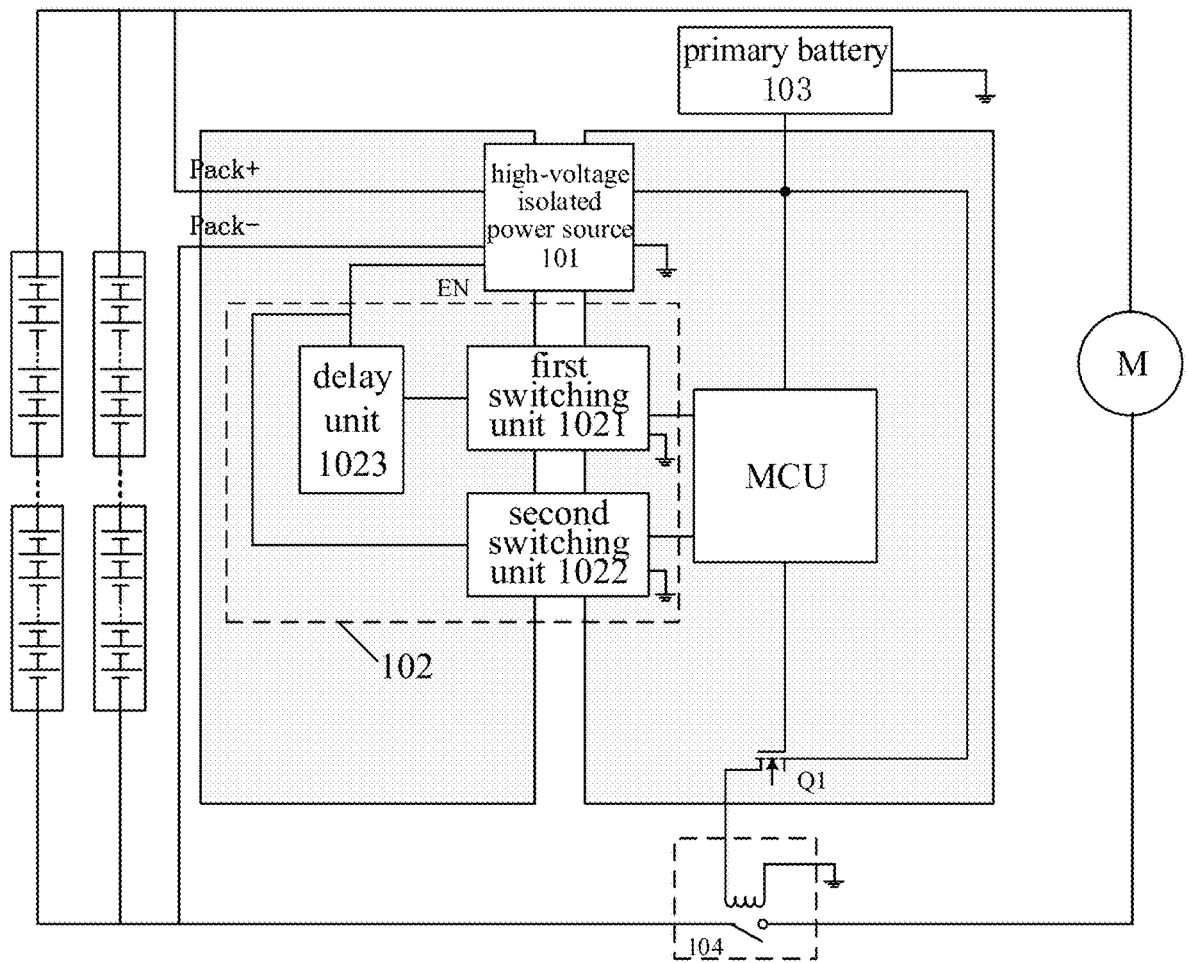
FIG. 2 is a schematic structural diagram of a relay holding circuit according to a second embodiment of the present disclosure.

FIG. 2 is a schematic structural diagram of a relay holding circuit according to a second embodiment of the present disclosure, which is used to show specific components of the power source driving module 102 described above. As shown in FIG. 2, the power source driving module 102 may include a first switching unit 1021, a second switching unit 1022, and a delay unit 1023.

As shown in FIG. 2, the MCU may be respectively connected to a first terminal of the first switching unit 1021 and a first terminal of the second switching unit 1022. An input terminal of the delay unit 1023 may be connected to a second terminal of the first switching unit 1021. An output terminal of the delay unit 1023 may be respectively connected to the high-voltage isolated power source 101 and a second terminal of the second switching unit 1022. The first switching unit 1021 and the second switching unit 1022 may be grounded.

A working principle of the power source driving module 102 in FIG. 2 may be as follows.

When the primary battery 103 supplies power normally, the MCU may respectively output a high-level signal to the first switching unit 1021 and the second switching unit 1022.

The first switching unit 1021 and the second switching unit 1022 may be turned on in response to the high-level signal. The delay unit 1023 may also output a high-level signal after the first switching unit 1021 is turned on. Here, since the second switching unit 1022 may be grounded after being turned on, the high-level signal output by the delay unit 1023 will be pulled down by the second switching unit 1022, so as to make the high-voltage isolated power source 101 in a locked state, that is, a non-working state.

When the primary battery 103 supplies power abnormally, the MCU may respectively output a low-level signal to the first switching unit 1021 and the second switching unit 1022. The first switching unit 1021 and the second switching unit 1022 may be turned off in response to the low-level signal. Here, the delay unit 1023 may output a high-level signal with delay in a predetermined time period after the first switching unit 1022 is turned off, and since the second switching unit 1022 is turned off, the high-level signal output with delay will not be pulled down, such that the high-voltage isolated power source 101 is in an enabled state. A person skilled in the art may set a duration of the predetermined time period that causes the delay according to actual situations. In general, the duration of the predetermined time period should be greater than a duration of the MCU having an instantaneous power failure.

Figure 3:
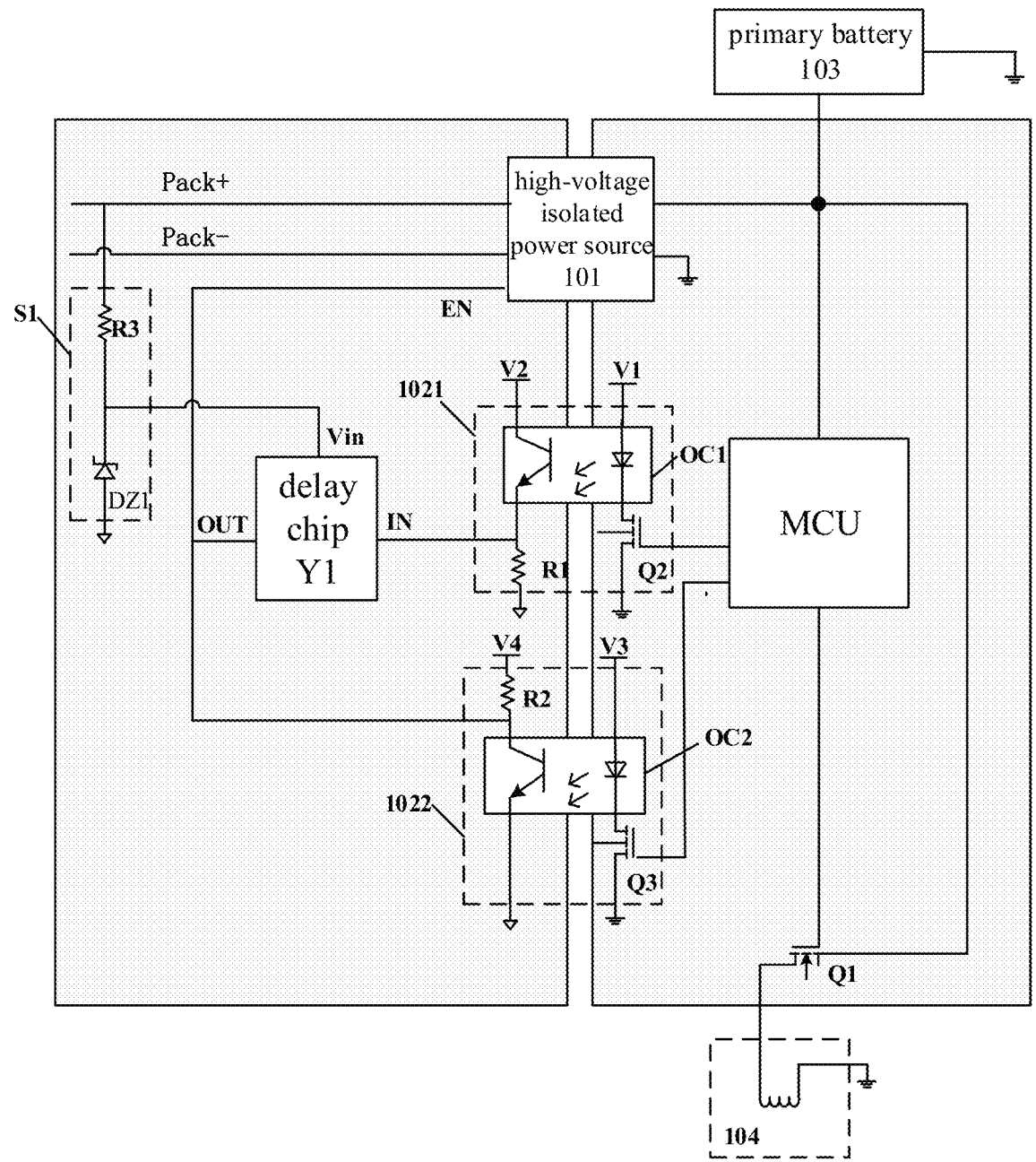
FIG. 3 is a schematic structural diagram of a relay holding circuit according to a third embodiment of the present disclosure.

FIG. 3 is a schematic structural diagram of a relay holding circuit according to a third embodiment of the present disclosure, which is used to show specific components of the first switching unit 1021, the second switching unit 1022, and the delay unit 1023 described above.

As shown in FIG. 3, the first switching unit 1021 may include an optical coupler OC1, a second switching device Q2, and a resistor R1. The second switching unit 1022 may include an optical coupler OC2, a third switching device Q3, and a resistor R2. The delay unit 1023 may include a delay chip Y1.

Wherein, a first terminal of a light emitting end of the optical coupler OC1 may be connected to a pull-up power source V1, a second terminal of the light emitting end of the optical coupler OC1 may be connected to a first terminal of the second switching device Q2, a second terminal of the second switching device Q2 may be grounded, and a control terminal of the second switching device Q2 may be connected to the MCU; a first terminal of a light receiving end of the optical coupler OC1 may be connected to a pull-up power source V2, a second terminal of the light receiving end of the optical coupler OC1 may be respectively connected to an input terminal of the delay chip Y1 and a first terminal of the resistor R1, and a second terminal of the resistor R1 may be grounded.

A first terminal of a light emitting end of the optical coupler OC2 may be connected to a pull-up power source V3, a second terminal of the light emitting end of the optical coupler OC2 may be connected to a first terminal of the third switching device Q3, a second terminal of the third switching device Q3 may be grounded, and a control terminal of the third switching device Q3 may be connected to the MCU; a first terminal of a light receiving end of the optical coupler OC2 may be respectively connected to an output terminal of the delay chip Y1 and a first terminal of the second resistor R2, a second terminal of the second resistor R2 may be connected to a pull-up power source V4, and a second terminal of the light receiving end of the optical coupler OC2 may be grounded.

A working principle of the components of the power source driving module 102 in FIG. 3 may be as follows.

When the primary battery 103 supplies power normally, the MCU may respectively output a high-level signal to the control terminal of the second switching device Q2 and the control terminal of the third switching device Q3. In response to the high-level signal, the first terminal and the second terminal of the second switching device Q2 may be turned on, the first terminal and the second terminal of the third switching device Q3 may be turned on, the light emitting end and the light receiving end of the optical coupler OC1 may be turned on, and the light emitting end and the light receiving end of the optical coupler OC2 may be turned on.

Wherein, after being turned on, the optical coupler OC1 may input a high-level signal to the delay chip Y1. After receiving the high-level signal, the delay chip Y1 may output a high-level signal. At the same time, after being turned on, the optical coupler OC2 may pull down the high-level signal output by the delay chip Y1, the high-voltage isolated power source 101 may be locked, and the high-voltage isolated power source 101 does not work.

When the primary battery 103 supplies power abnormally, the MCU may respectively output a low-level signal to the control terminal of the second switching device Q2 and the control terminal of the third switching device Q3. In response to the low-level signal, the first terminal and the second terminal of the second switching device Q2 may be turned off, the first terminal and the second terminal of the third switching device Q3 may be turned off, the light emitting end and the light receiving end of the optical coupler OC1 may be turned off, and the light emitting end and the light receiving end of the optical coupler OC2 may be turned off.

Wherein, after the optical coupler OC1 is turned off, the delay chip Y1 may output a high-level signal with delay in a predetermined time period. However, since the optical coupler OC2 is turned off, it will not pull down the high-level signal output by the delay chip Y1. Thus, the high-voltage isolated power source 101 may be enabled, and the high-voltage isolated power source 101 may be woken up to work.

As described above, in the embodiments of the present disclosure, the isolated optical coupler OC1, the isolated optical coupler OC2, the second switching device Q2, and the third switching device Q3 may be used in combination to implement locking and waking up of the high-voltage isolated power source 101. In addition, the isolated optical coupler may also prevent the working signal from being affected by the high-voltage signal of the battery pack during the locking and waking process, thereby improving the control accuracy of the relay holding circuit.

In some optional embodiments, the power source driving module 102 may further include a voltage-stabilizing source S1 that supplies power to the delay chip Y1, and is configured to provide working power for the delay chip Y1.

As shown in FIG. 3, the voltage-stabilizing source S1 may include a voltage-stabilizing diode DZ1 and a resistor R3. An anode of the voltage-stabilizing diode DZ1 may be grounded, and a cathode of the voltage-stabilizing diode DZ1 may be respectively connected to a first terminal of the resistor R3 and a power supplying terminal (Vin) of the delay chip Y1. A second terminal of the resistor R3 may be connected to the positive electrode (Pack+) of the battery pack. Wherein, the resistor R3 may be a resistor set or a resistor network.

It should be noted that, in order to avoid signal interference from a high-voltage side to a low-voltage side, the voltage-stabilizing diode DZ1 and the delay chip Y1 may be connected to a reference potential of the high-voltage side, such as the negative electrode of the battery pack, and the second switching device Q2 and the third switching device Q3 may be connected to a reference potential of the low-voltage side, such as the negative electrode of the primary battery.

Figure 4:
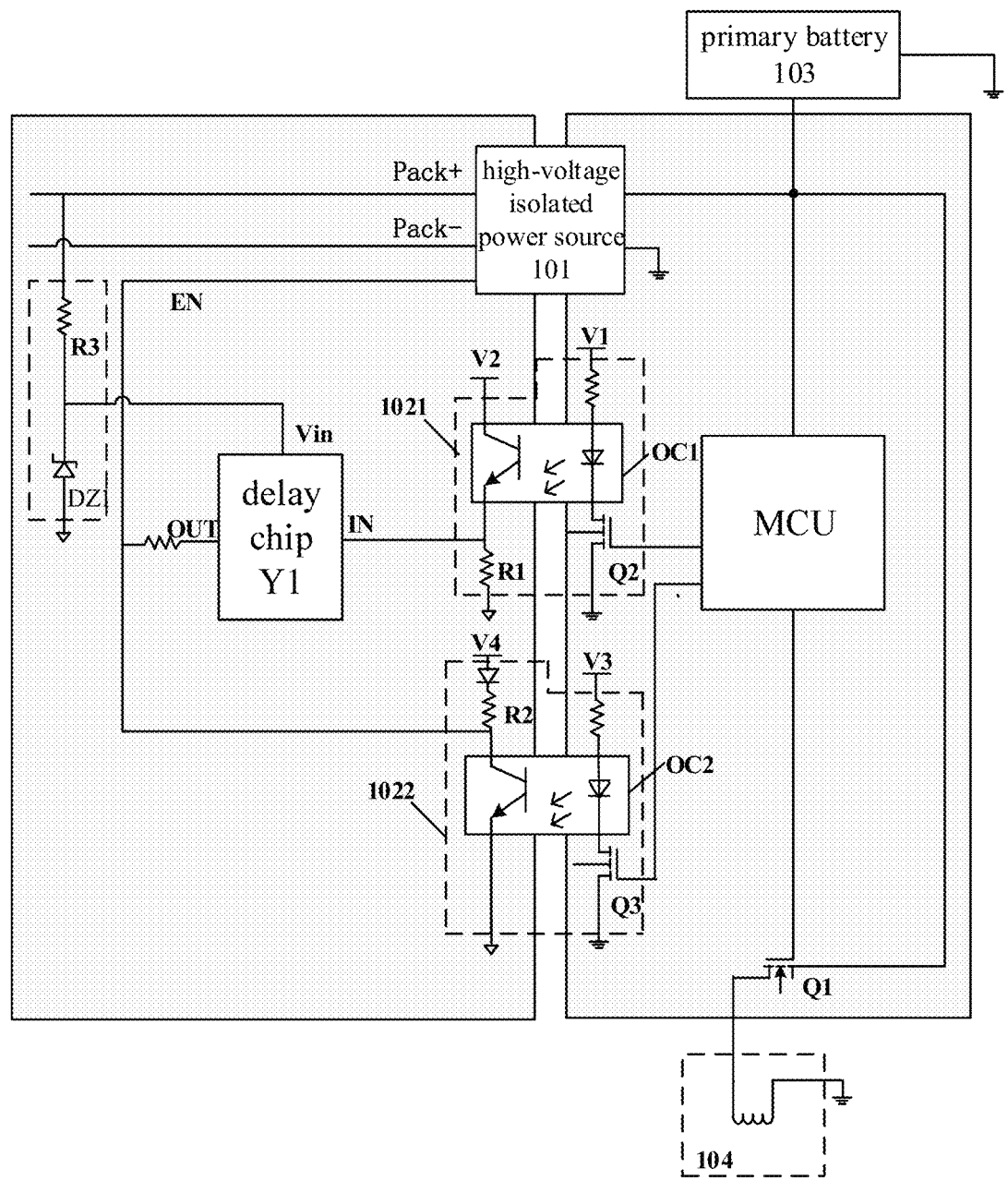
FIG. 4 is a schematic structural diagram of a relay holding circuit according to a fourth embodiment of the present disclosure.

FIG. 4 is a schematic structural diagram of a relay holding circuit according to a fourth embodiment of the present disclosure. The difference between FIG. 4 and FIG. 3 is that, in FIG. 4, a pull-up resistor may be added between the pull-up power source V1 and the light emitting end of the optical coupler OC1, and an appropriate working voltage may be applied to the light emitting the optical coupler OC1 by dividing the voltage of the pull-up power source V1.

As shown in FIG. 4, a pull-up resistor may also be added between the pull-up power source V3 and the light emitting end of the optical coupler OC2, and an appropriate working voltage may be applied to the light emitting end of the optical coupler OC2 by dividing the voltage of the pull-up power source V3.

In actual working process, the high-voltage isolated power source 101 may take a long time to start. In order to supply power to the battery management system normally during a period that the lead-acid battery supplies power abnormally and the high-voltage isolated power supply is not fully started, a capacitor may be added to the relay holding circuit. Energy stored in the capacitor may be used to supply power to the battery management system normally during the period that the lead-acid battery supplies power abnormally and the high-voltage isolated power supply is not fully started, thereby ensuring the safe driving strategy of the electric vehicle.

Figure 5:
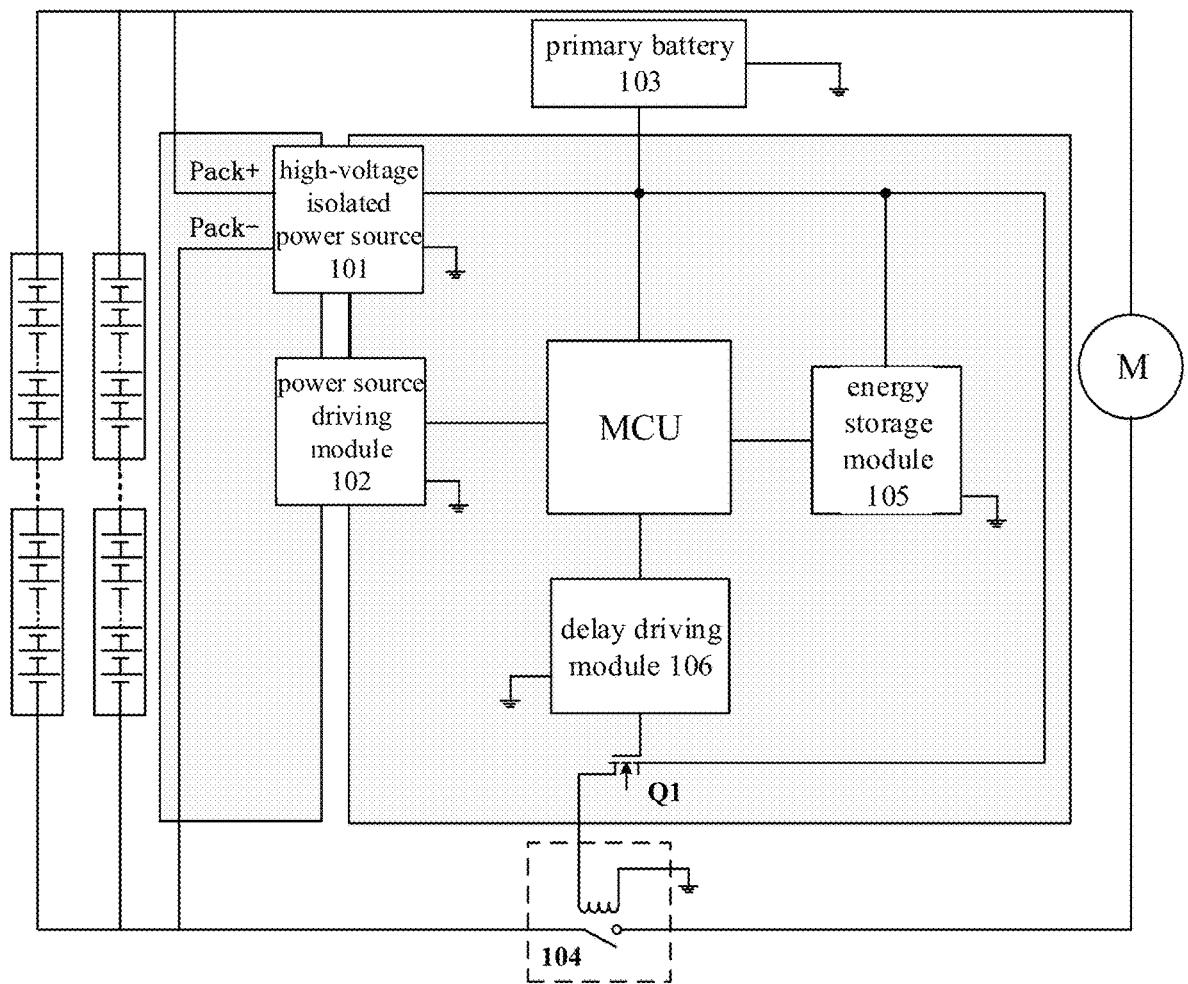
FIG. 5 is a schematic structural diagram of a relay holding circuit according to a fifth embodiment of the present disclosure.

FIG. 5 is a schematic structural diagram of a relay holding circuit according to a fifth embodiment of the present disclosure. The difference between FIG. 5 and FIG. 1 is that, the relay holding circuit in FIG. 5 may further include an energy storage module 105 and a delay driving module 106 for maintaining a short-time conducting state of the relay by using energy stored in a large capacitor.

As shown in FIG. 5, a first terminal of the energy storage module 105 may be respectively connected to the primary battery 103, the high-voltage isolated power source, and the second terminal of the first switching device Q1. A second terminal of the energy storage module 105 may be connected to the MCU. An input terminal of the delay driving module 106 may be connected to the MCU, and an output terminal of the delay driving module 106 may be connected to the control terminal of the first switching device Q1.

A working principle of the energy storage module 105 and the delay driving module 106 in FIG. 5 may be as follows.

When the primary battery 103 supplies power normally, the primary battery 103 may respectively supply power to the MCU, the energy storage module 105, and the second terminal of the first switching device Q1. The MCU may output a high-level signal to the energy storage module 105 and the delay driving module 106. In response to the high-level signal, the energy storage module 105 may be in a charging state, and the delay driving module 106 may output a high-level signal to the control terminal of the first switching device Q1. The first terminal and the second terminal of the first switching device Q1 may be turned on, and the coil of the relay 104 may be energized.

When the primary battery 103 supplies power abnormally, the primary battery 103 may stop supplying power to the MCU. The energy storage module 105 may switch from the charging state to a discharging state. The MCU may output a low-level signal to the delay driving module 106. The delay driving module 106 may output a high-level signal with delay to the control terminal of the first switching device Q1 in a predetermined time period. The energy storage module 105 may supply power to the coil of the relay 104, such that the coil of the relay may remain a conducting state during a period that the primary battery supplies power abnormally and the high-voltage isolated power source is not started, thereby improving the driving safety and reliability of the electric vehicle.

Figure 6:
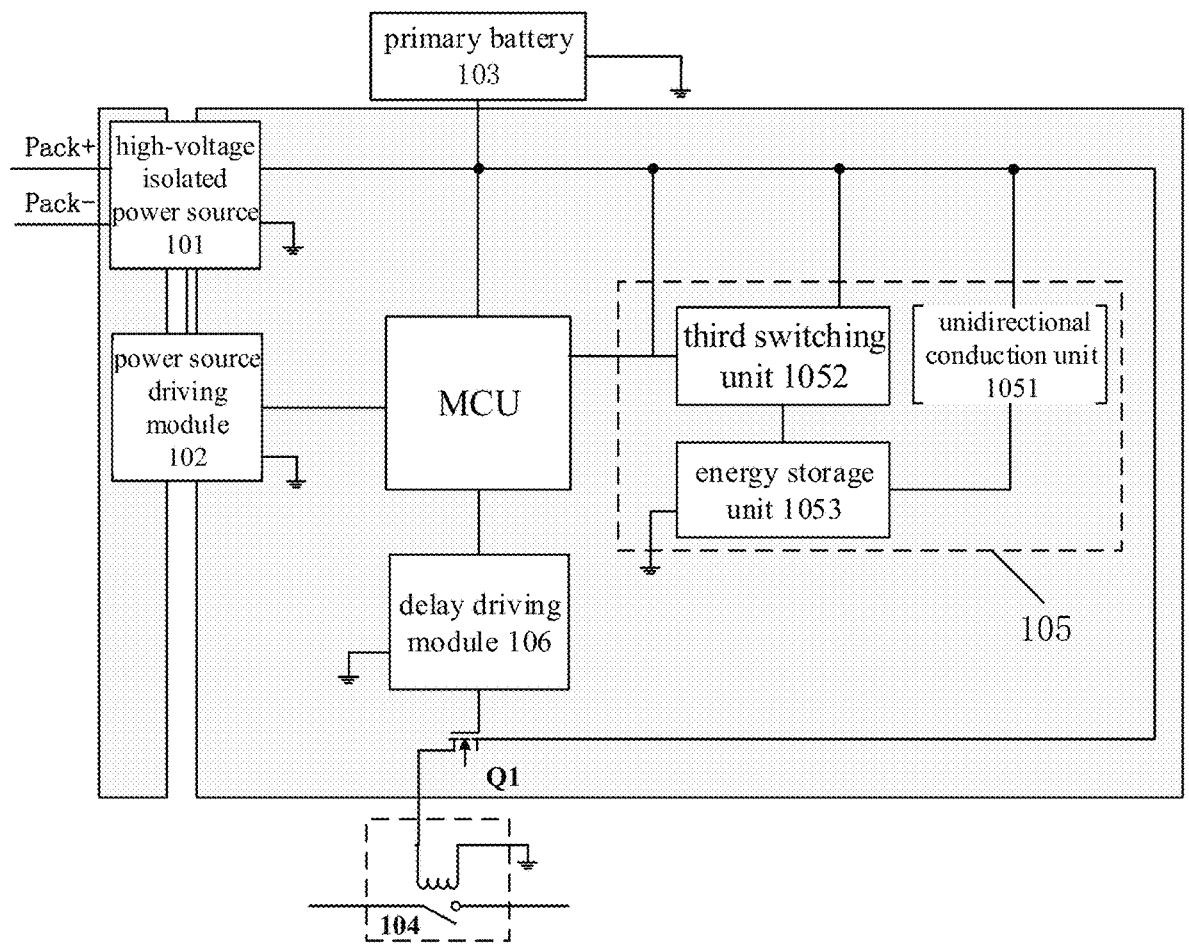
FIG. 6 is a schematic structural diagram of a relay holding circuit according to a sixth embodiment of the present disclosure.

FIG. 6 is a schematic structural diagram of a relay holding circuit according to a sixth embodiment of the present disclosure, which is used to show specific components of the energy storage module 105 described above. As shown in FIG. 6, the energy storage module 105 may include a unidirectional conduction unit 1051, a third switching unit 1052, and an energy storage unit 1053.

Wherein, an input terminal of the unidirectional conduction unit 1051 may be connected to the primary battery 103, and an output terminal of the unidirectional conduction unit 1051 may be connected to a first terminal of the energy storage unit 1053.

A second terminal of the energy storage unit 1053 may be connected to a first terminal of the third switching unit 1052, a second terminal of the third switching unit 1052 may be connected to the second terminal of the first switching device Q1, and a control terminal of the third switching unit 1052 may be respectively connected to the primary battery 103 and the MCU.

A working principle of the energy storage module 105 in FIG. 6 may be as follows.

When the primary battery 103 supplies power normally, the primary battery 103 may supply power to the MCU and the second terminal of the first switching device Q1, and may charge the energy storage unit 1053 through the unidirectional conduction unit 1051. The third switching unit 1052 may be turned off, and the power stored in the energy storage unit 1053 cannot be transferred outwards.

When the primary battery 103 supplies power abnormally, the primary battery 103 may stop supplying power to the BMS. The third switching unit 1052 may be turned on, the energy storage unit 1053 may switch from a charging state to a discharging state, and may supply power to the second terminal of the first switching device Q1 until the high-voltage isolated power source 101 is activated. After that, the MCU may output a high-level signal to the third switching unit 1052, such that the third switching unit 1052 may be turned off. The energy storage unit 1053 may switch from the discharging state to the charging state.

In some optional embodiments, the energy storage unit 1053 may charge the primary battery 103 when the primary battery supplies power abnormally. This may solve the problem of supplying power abnormally due to insufficient power of the primary battery, and the coil of the relay may remain the conducting state during a period that the primary battery supplies power abnormally and the high-voltage isolated power source is not started.

Figure 7:
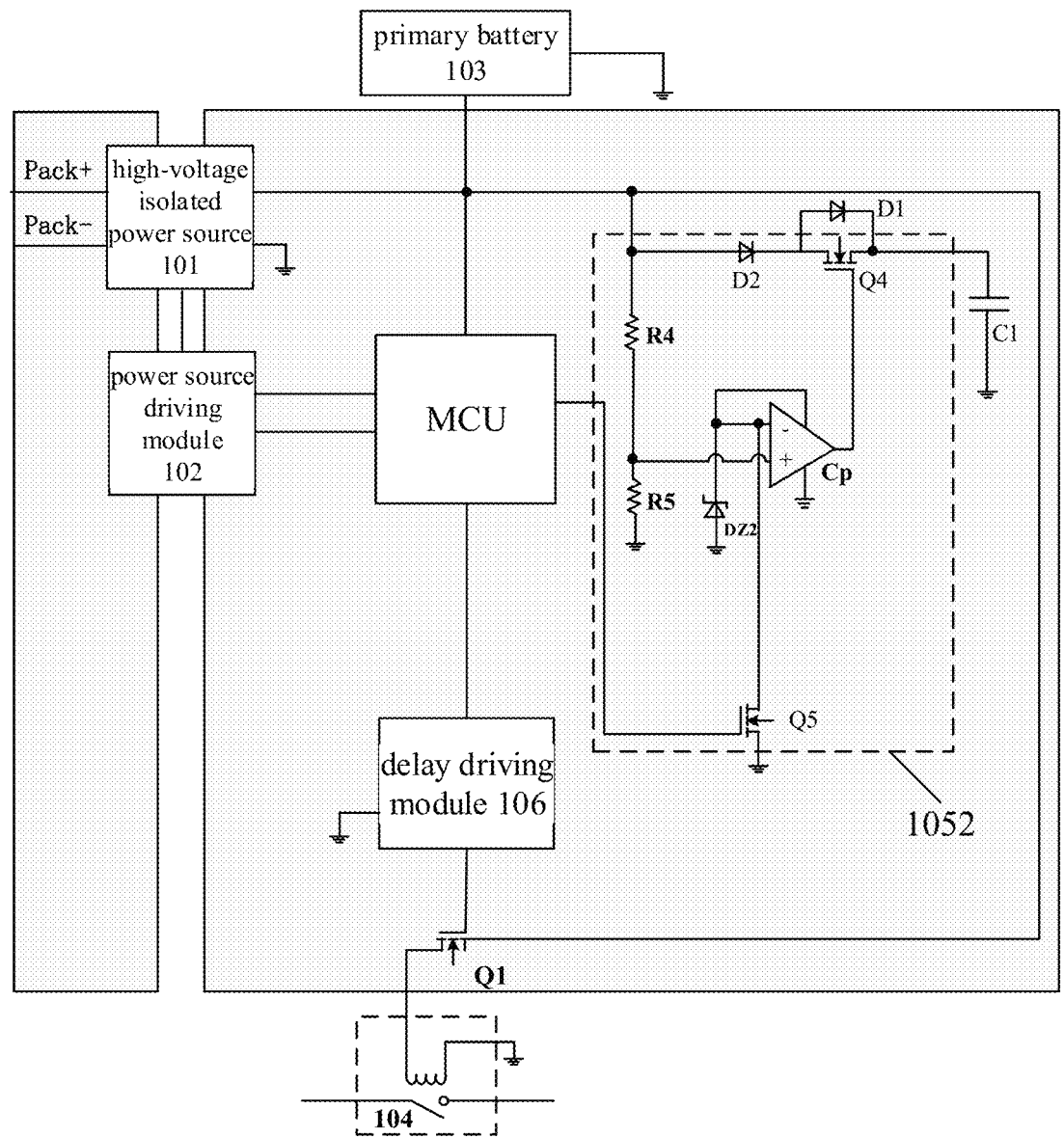
FIG. 7 is a schematic structural diagram of a relay holding circuit according to a seventh embodiment of the present disclosure.

FIG. 7 is a schematic structural diagram of a relay holding circuit according to a seventh embodiment of the present disclosure, which is used to show specific components of the unidirectional conduction unit 1051, the third switching unit 1052, and the energy storage unit 1053 described above.

As shown in FIG. 7, the unidirectional conduction unit 1051 may be implemented by a diode D1, the energy storage unit 1053 may be implemented by a large capacitor C1, and the third switching unit 1052 may specifically include a resistor R4, a resistor R5, a second voltage-stabilizing diode DZ2, a comparator Cp, a fourth switching device Q4, and a fifth switching device Q5.

Wherein, the fourth switching device Q4 may be connected in parallel to two terminals of the diode D1, and a control terminal of the fourth switching device Q4 may be connected to an output terminal of the comparator Cp.

A non-inverting input terminal "+" of the comparator Cp may be connected to a first terminal of the resistor R4 and a first terminal of the resistor R5 (also can be understood as a voltage dividing point of R4 and R5), a second terminal of the resistor R4 may be connected to the primary battery 103, and a second terminal of resistor R5 may be grounded.

An inverting input terminal "−" of the comparator Cp may be connected to a cathode of the second voltage-stabilizing diode DZ2 and a first terminal of the fifth switching device Q5, an anode of the second voltage-stabilizing diode DZ2 may be grounded, a second terminal of the fifth switching device Q5 may be grounded, and a control terminal of the fifth switching device Q5 may be connected to the MCU.

Wherein, the resistor R3 may be a resistor set or a resistor network.

In some embodiments, a diode D2 may be added to a line between the resistor R4 and the diode D1 to further ensure that the power stored in the energy storage unit 1053 will not be discharged when the primary battery supplies power normally.

A working principle of the unidirectional conduction unit 1051, the third switching unit 1052, and the energy storage unit 1053 in FIG. 7 may be as follows.

When the primary battery 103 supplies power normally, the primary battery 103 may supply power to the MCU and the second terminal of the switching device Q1. The MCU may output a high-level signal to the switching device Q5, the fifth switching device Q5 may be turned on, and the fourth switching device Q4 may be turned off. The primary battery 103 may charge the large capacitor C1 through the diode D1, and the power stored in the large capacitor C1 cannot be transferred outward.

When the primary battery 103 supplies power abnormally, the primary battery 103 may stop supplying power to the MCU. The MCU may output a low-level signal to the fifth switching device Q5, and the fifth switching device Q5 may be turned off. At the same time, a voltage division value between the resistor R4 and the resistor R5 may decrease. A voltage at the non-inverting input terminal "+" of the comparator Cp may be lower than a voltage at the inverting input terminal "−" of the comparator Cp. The output terminal of the comparator Cp may be grounded, and the fourth switching device Q4 may be turned on. The large capacitor C1 may be switched from the charging state to the discharging state, and may supply power to the second terminal of the switching device Q1.

After the high-voltage isolated power supply 101 is enabled, the MCU may output a high-level signal to the fifth switching device Q5, and the fifth switching device Q5 may be turned on. The voltage at the non-inverting input terminal "+" of the comparator Cp may be higher than the voltage at the inverting input terminal "−" of the comparator Cp. The fourth switching device Q4 may be turned on, and the large capacitor C1 may be switched from the discharging state to the charging state.

Figure 8:
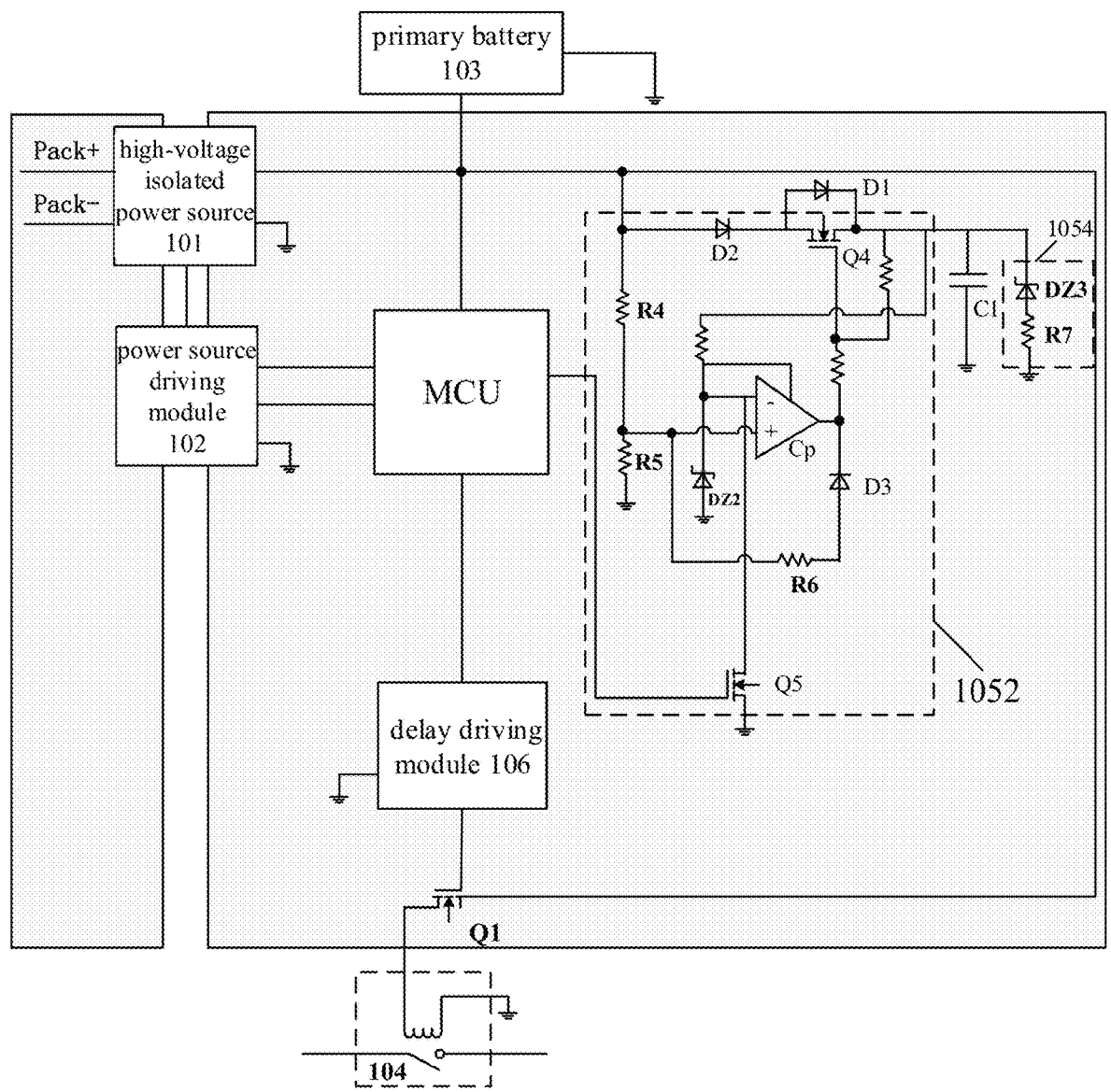
FIG. 8 is a schematic structural diagram of a relay holding circuit according to an eighth embodiment of the present disclosure.

FIG. 8 is a schematic structural diagram of a relay holding circuit according to an eighth embodiment of the present disclosure, which is used to optimize the circuit structure in FIG. 7. The third switching unit 1052 in FIG. 8 may further include a resistor R6 and a unidirectional conduction device D3.

The unidirectional conduction device shown in FIG. 8 may be a diode D3.

As shown in FIG. 8, a first terminal of the resistor R6 may be connected to the non-inverting input terminal "+" of the comparator Cp, a second terminal of the resistor R6 may be connected to an anode of the diode D3, and a cathode of the diode D3 may be connected to the output terminal of the comparator Cp.

When the output terminal of the comparator Cp is grounded, the resistor R6, the diode D3, and the resistor R5 may be connected in parallel, such that the voltage division value of the non-inverting input terminal "+" of the comparator Cp may be further reduced, and control accuracy of the comparator Cp may be improved. Thus, the fourth switching device Q4 may be started in time to switch the large capacitor C1 from the charging state to the discharging state, and to supply power to the second terminal of the first switching device Q1.

In some optional embodiments, the energy storage module 105 may further include a voltage-stabilizing unit 1054 for maintaining a voltage stability of the large capacitor C1.

The voltage-stabilizing unit 1054 may include a voltage-stabilizing diode DZ3 and a resistor R7. A cathode of the voltage-stabilizing diode DZ3 may be connected to the first terminal of the large capacitor C1, an anode of the voltage-stabilizing diode DZ3 may be connected to a first terminal of the resistor R7, and a second terminal of the resistor R7 may be grounded.

FIG. 8 further illustrates some electronic components disposed in the circuit of the third switching unit 1052 for improving circuit function of the third switching unit 1052.

For example, the third switching unit 1052 may further include a pull-up resistor located between the control terminal of the fourth switching device Q4 and the output terminal of the comparator Cp, so as to pull up a control signal input to the fourth switching device Q4. The third switching unit 1052 may further include a resistor element located between the second terminal of the fourth switching device Q4 and the inverting input terminal "−" of the comparator Cp, and a resistor element located between the second terminal of the fourth switching device Q4 and the output terminal of the comparator Cp, so as to reduce an influence of a voltage signal of the large capacitor C1 on the input and output signals of the comparator Cp.

Figure 9:
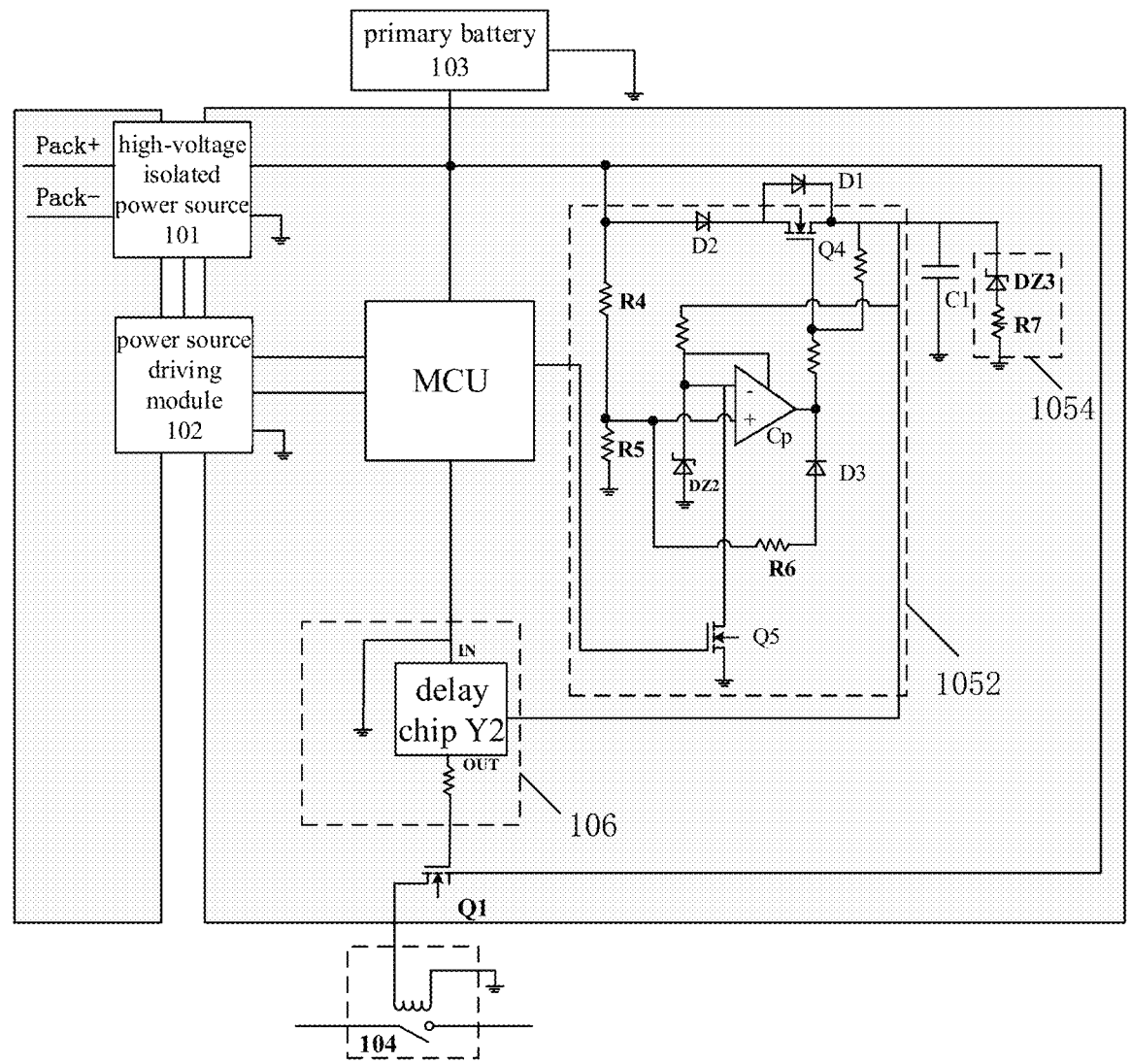
FIG. 9 is a schematic structural diagram of a relay holding circuit according to a ninth embodiment of the present disclosure.

FIG. 9 is a schematic structural diagram of a relay holding circuit according to a ninth embodiment of the present disclosure, which is used to show specific components of the delay driving module 106 described above.

As shown in FIG. 9, the delay driving module 106 may include a delay chip Y2 and a protection resistor located between an output terminal of the delay chip Y2 and the control terminal of the first switching device Q1.

Wherein, an input terminal of the delay chip Y2 may be connected to the MCU, and the output terminal of the delay chip Y2 may be connected to the control terminal of the first switching device Q1. A main function of the delay chip Y2 is to output the high-level signal with delay, and the specific delay time may be set by hardware.

Figure 10:
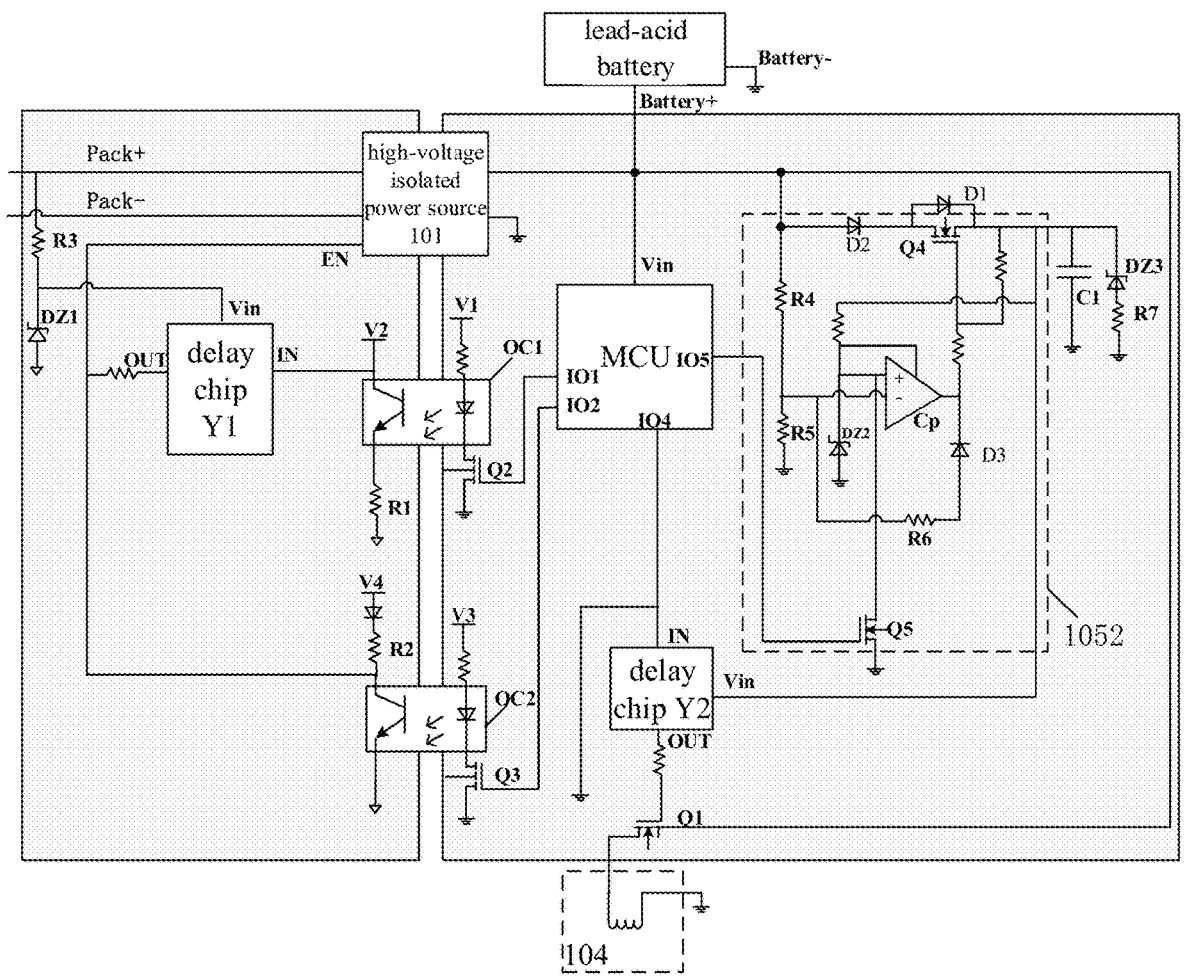
FIG. 10 is a schematic structural diagram of a relay holding circuit according to a tenth embodiment of the present disclosure.

FIG. 10 is a schematic structural diagram of a relay holding circuit according to a tenth embodiment of the present disclosure. As an example of the relay holding circuit, FIG. 10 fully illustrates specific components of the relay holding circuit. FIG. 10 illustrates four IO ports (IO1, IO2, IO4, and IO5) of the MCU.

The working process of the relay holding circuit of the embodiments of the present application will be described in detail below with reference to FIG. 10:

S1: When the MCU works normally, the relay 104 (including a main positive relay and a main negative relay) of the electric vehicle may be turned on, and the electric vehicle runs normally. A low-voltage isolated power source (not shown) may be in a working state and used to provide pull-up power (V1-V4).

At this time, the port IO1 may be in a high-level output state, and the port IO2 may be in a high-level output state. The high-voltage isolated power supply 101 may be locked (not enabled when EN is low), and may be in a non-operating state. An output state of the port IO4 may be high-level, and the drive relay 104 may be closed. The port IO5 may be high-level, the fourth switching device Q4 may be turned off, and the third switching device Q3 may be turned off. At this time, due to the presence of the diodes D1 and D2, the lead-acid battery may charge the large capacitor C1, but the large capacitor C1 cannot discharge to the MCU.

S2: When the lead-acid battery has a failure or a line connected to the MCU system has a failure, the positive voltage Battery+ of the lead-acid battery may drop rapidly. When the Battery+ drops to a minimum working voltage of the MCU, the MCU may stop working. When the voltage at the non-inverting input terminal "+" of the comparator Cp is higher than the voltage at the inverting input terminal "−" of the comparator Cp, the output terminal of the comparator Cp may be grounded. At this time, the third switching device Q3 may be turned on to be grounded. A conduction energy of the relay 104 is provided by the large capacitor C1 when the MCU is stopped and the high-voltage isolated power source 101 is not started. As shown in FIG. 10, the minimum working voltage of the MCU (i.e., a discharge voltage threshold of the large capacitor C1) may be set through the resistors R4 and R5.

After the MCU is abnormally powered, the outputs of the ports IO1, IO2, IO4, and IO5 may be low-level, and OC1 and OC2 may be not turned on. Due to the role of delay chip Y1, the output of delay chip Y1 may be pulled down after a preset time, so at this time, the enable signal of the high-voltage isolated power source 101 may be high-level, and the high-voltage isolated power source 101 may be woken up and start to work.

S3: After the high-voltage isolated power source 101 works, it may replace the lead-acid battery to supply power to the MCU. The MCU may restart to work. When the output voltage of the high-voltage isolated power source 101 is higher than the voltage of the large capacitor C1, the large capacitor C1 may stop outputting energy to the system and perform charging.

The voltage-stabilizing unit of DZ3 and R7 may constitute a protection circuit for the large capacitor C1. By providing a discharge circuit, the large capacitor C1 is prevented from being damaged by overshoot.

In an embodiment, a formula for calculating a capacitance of the large capacitor C1 may be:

$$C > \frac{I \times T}{U_{Bat\_min} - U_{Rea\_min}} \quad (1)$$

Wherein, I is a holding current required by the relay 104, T is a starting time of the high-voltage isolated power source 101, $U_{Bat\_min}$ is a minimum voltage of the lead-acid battery during normal operation, and $U_{Rea\_min}$ is a minimum voltage required by the relay 104.

S4: After the MCU works normally, the fourth switching device Q4 may be turned on and quickly turned off. During the fourth switching device Q4 being turned on, the inverting input terminal "−" of the comparator Cp may be grounded, and the output terminal of the comparator Cp may be changed from a grounded state to a high-impedance state. The third switching device Q3 may be turned off, the MCU may enable ports IO1, IO4, and output a high-level signal again.

S5: After the MCU detects that the power supply system returns to normal, the MCU may enable IO2 and turn off the high-voltage isolated power source 101. At this time, the lead-acid battery still supply power to the MCU.

Based on the above steps, during the power loss of the MCU, the relay may still maintain the state before the power loss. This strategy may ensure the driving safety of the vehicle.

In addition, an embodiment of the present application further provides a battery management system, which may include the relay holding circuit as described above.

It should be noted that the battery management system may be a separately sold device in which the relay holding circuit is integrated.

Although the present disclosure has been described with reference to the embodiments, various modifications may be made thereto and components thereof may be replaced with equivalents without departing from the scope of the present application. Particularly, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A relay holding circuit, comprising: a high-voltage isolated power source, a power source driving module, and a microprocessor of a battery management system; wherein the high-voltage isolated power source is respectively connected to two electrodes of a battery pack, an output terminal of the power source driving module, the microprocessor, and a first terminal of a first switching device;

an input terminal of the power source driving module is connected to the microprocessor, a control terminal of the first switching device is connected to the microprocessor, the first terminal of the first switching device is further connected to a primary battery, a second terminal of the first switching device is connected to a coil of a relay, and a contact of the relay is disposed on a line between the battery pack and a motor;

the microprocessor is further connected to the primary battery, the microprocessor outputs a low-level signal to the power source driving module when the primary battery supplies power abnormally, and the power source driving module enables the high-voltage isolated power source to convert high-voltage power output by the battery pack into low-voltage power in response to the low-level signal, so as to supply power to the microprocessor and the second terminal of the first switching device, such that the coil of the relay remains a conducting state during a period that the primary battery supplies power abnormally;

wherein the power source driving module comprises: a first switching unit, a second switching unit, and a delay unit; wherein the microprocessor is respectively connected to a first terminal of the first switching unit and a first terminal of the second switching unit, an input terminal of the delay unit is connected to a second terminal of the first switching unit, and an output terminal of the delay unit is respectively connected to the high-voltage isolated power source and a second terminal of the second switching unit; and the microprocessor respectively outputs a low-level signal to the first switching unit and the second switching unit when the primary battery supplies power abnormally, the first switching unit and the second switching unit are turned off in response to the low-level signal, and the delay unit outputs a high-level signal with delay in a predetermined time period after the first switching unit is turned off, so as to enable the high-voltage isolated power source.

2. The relay holding circuit according to claim 1, wherein the first switching unit comprises a first optical coupler, a second switching device, and a first resistor; wherein a first terminal of a light emitting end of the first optical coupler is connected to a first pull-up power source, a second terminal of the light emitting end of the first optical coupler is connected to a first terminal of the second switching device, a second terminal of the second switching device is grounded, and a control terminal of the second switching device is connected to the microprocessor;

a first terminal of a light receiving end of the first optical coupler is connected to a second pull-up power source, a second terminal of the light receiving end of the first optical coupler is respectively connected to the input terminal of the delay unit and a first terminal of the first resistor, and a second terminal of the first resistor is grounded.

3. The relay holding circuit according to claim 1, wherein the second switching unit comprises a second optical coupler, a third switching device, and a second resistor; wherein a first terminal of a light emitting end of the second optical coupler is connected to a third pull-up power source, a second terminal of the light emitting end of the second optical coupler is connected to a first terminal of the third switching device, a second terminal of the third switching device is grounded, and a control terminal of the third switching device is connected to the microprocessor;

a first terminal of a light receiving end of the second optical coupler is respectively connected to the output terminal of the delay unit and a first terminal of the second resistor, a second terminal of the second resistor is connected to a fourth pull-up power source, and a second terminal of the light receiving end of the second optical coupler is grounded.

4. The relay holding circuit according to claim 1, wherein the delay unit comprises a first delay chip, and the power source driving module further comprises a voltage-stabilizing source for supplying power to the first delay chip;

the voltage-stabilizing source comprises a first voltage-stabilizing diode and a third resistor;

an anode of the first voltage-stabilizing diode is grounded, a cathode of the first voltage-stabilizing diode is respectively connected to a first terminal of the third resistor and a power supplying terminal of the first delay chip, and a second terminal of the third resistor is connected to a positive electrode of the battery pack.

5. The relay holding circuit according to claim 1, wherein the relay holding circuit further comprises an energy storage module and a delay driving module; wherein a first terminal of the energy storage module is connected to the primary battery, the high-voltage isolated power source, and the second terminal of the first switching device, and a second terminal of the energy storage module is connected to the microprocessor;

an input terminal of the delay driving module is connected to the microprocessor, and an output terminal of the delay driving module is connected to the control terminal of the first switching device;

the microprocessor respectively outputs a low-level signal to the energy storage module and the delay driving module when the primary battery supplies power abnormally, the energy storage module supplies power to the second terminal of the first switching device in response to the low-level signal, and the delay driving module outputs a high-level signal with delay to the control terminal of the first switching device in response to the low-level signal, such that the coil of the relay remains the conducting state during a period that the primary battery supplies power abnormally and the high-voltage isolated power source is not started.

6. The relay holding circuit according to claim 5, wherein the energy storage module comprises: a unidirectional conduction unit, a third switching unit, and an energy storage unit; wherein an input terminal of the unidirectional conduction unit is connected to the primary battery, and an output terminal of the unidirectional conduction unit is connected to a first terminal of the energy storage unit;

a second terminal of the energy storage unit is connected to a first terminal of the third switching unit, a second terminal of the third switching unit is connected to the second terminal of the first switching device, and a control terminal of the third switching unit is respectively connected to the primary battery and the microprocessor.

7. The relay holding circuit according to claim 6, wherein the third switching unit comprises a fourth resistor, a fifth resistor, a second voltage-stabilizing diode, a comparator, a fourth switching device, and a fifth switching device; wherein the fourth switching device is connected in parallel to two terminals of the unidirectional conduction unit, and a control terminal of the fourth switching device is connected to an output terminal of the comparator;

a non-inverting input terminal of the comparator is respectively connected to a first terminal of the fourth resistor and a first terminal of the fifth resistor, a second terminal of the fourth resistor is connected to the primary battery, and a second terminal of the fifth resistor is grounded;

an inverting input terminal of the comparator is respectively connected to a cathode of the second voltage-stabilizing diode and a first terminal of the fifth switching device, an anode of the second voltage-stabilizing diode is grounded, a second terminal of the fifth switching device is grounded, and a control terminal of the fifth switching device is connected to the microprocessor.

8. The relay holding circuit according to claim 7, wherein the third switching unit further comprises a sixth resistor and a unidirectional conduction device;

a first terminal of the sixth resistor is connected to the non-inverting input terminal of the comparator, a second terminal of the sixth resistor is connected to an anode of the unidirectional conduction device, and a cathode of the unidirectional conduction device is connected to the output terminal of the comparator.

9. The relay holding circuit according to claim 6, wherein the energy storage module further comprises a voltage-stabilizing unit, and the voltage-stabilizing unit comprises a third voltage-stabilizing diode and a seventh resistor;

a cathode of the third voltage-stabilizing diode is connected to the first terminal of the energy storage unit, an anode of the third voltage-stabilizing diode is connected to a first terminal of the seventh resistor, and a second terminal of the seventh resistor is grounded.

10. The relay holding circuit according to claim 5, wherein the delay driving module comprises a second delay chip, an input terminal of the second delay chip is connected to the microprocessor, and an output terminal of the second delay chip is connected to the control terminal of the first switching device.

11. A battery management system, comprising the relay holding circuit according to claim 1.

\* \* \* \* \*